United States Patent
Ito

(10) Patent No.: US 8,267,631 B2
(45) Date of Patent: Sep. 18, 2012

(54) FITTING MEMBER POSITIONING DEVICE

(75) Inventor: Takayoshi Ito, Ichinomiya (JP)

(73) Assignee: Infom Co., Ltd. (JP)

( * ) Notice: Subject to any disclaimer, the term of this patent is extended or adjusted under 35 U.S.C. 154(b) by 0 days.

(21) Appl. No.: 13/185,250

(22) Filed: Jul. 18, 2011

(65) Prior Publication Data

US 2012/0020591 A1 Jan. 26, 2012

(30) Foreign Application Priority Data

Jul. 26, 2010 (JP) ................................. 2010-167448

(51) Int. Cl.
*F16B 21/00* (2006.01)

(52) U.S. Cl. .......................................... 411/550; 411/55

(58) Field of Classification Search ........................ None
See application file for complete search history.

(56) References Cited

U.S. PATENT DOCUMENTS

| | | | | |
|---|---|---|---|---|
| 2,075,234 A | * | 3/1937 | Schulz | 404/56 |
| 3,269,251 A | * | 8/1966 | Bass | 411/21 |
| 3,414,304 A | * | 12/1968 | Miller | 403/408.1 |
| 4,537,541 A | * | 8/1985 | Giannuzzi | 411/55 |
| 4,740,124 A | * | 4/1988 | Pearson et al. | 411/88 |
| 5,496,006 A | * | 3/1996 | Kulka et al. | 248/231.9 |
| 5,603,593 A | * | 2/1997 | Fischer et al. | 411/55 |
| 5,993,128 A | * | 11/1999 | Mark et al. | 411/30 |
| 6,186,695 B1 | * | 2/2001 | Kuster | 403/297 |
| 6,918,724 B2 | * | 7/2005 | Eriksson | 411/45 |

FOREIGN PATENT DOCUMENTS

| | | |
|---|---|---|
| EP | 0 474 397 A1 | 3/1992 |
| GB | 0 131893 | 11/1919 |
| GB | 2 094 695 A | 9/1982 |
| JP | 55-80511 A | 9/1953 |
| JP | 55-112107 A | 1/1954 |
| JP | 55-112107 | 8/1980 |
| JP | 2003-311631 A | 11/2003 |

* cited by examiner

*Primary Examiner* — Gary Estremsky
(74) *Attorney, Agent, or Firm* — Bacon and Thomas, PLLC

(57) ABSTRACT

A fitting member positioning device, that can be reliably fixed in a predetermined position relative to an installation portion, includes a first element having an insert portion received in an insertion hole, the insert portion having a first thread portion, and a second element rotatable relative to the first element and axially movable, having a second thread portion received in the first thread portion. The insert portion includes an integral annular dilating portion, while the second element includes an advancing portion for advancing into and integrally dilating the dilating portion in the circumferential direction when the second element is axially moved with rotation by the first and second thread portions being threaded together, to press the first element against an inner circumferential surface of an insertion hole to prevent movement of the first element.

3 Claims, 9 Drawing Sheets

FITTING MEMBER POSITIONING DEVICE

FIELD OF THE INVENTION

The present invention relates to a fitting member positioning device.

BACKGROUND OF THE INVENTION

Conventionally, in the machining tools including a machining center and a lathe, a linear guide rail is disposed on a base for slidably guiding a given member in the longitudinal direction.

The linear guide rail is positioned relative to the base by abutting one side of the linear guide rail on a reference face consisting of a vertical step formed on the base along the longitudinal direction and fastening a fixing bolt.

However, in such a linear guide rail, the inner diameter of an insertion hole for receiving the fixing bolt is defined larger than the outer diameter of the fixing bolt and thus a clearance is created between the fixing bolt and the insertion hole, resulting in the failure of accurate contact between the one side of the linear guide rail and the reference face.

Accordingly, a pressure holding device serving as a fitting member positioning device is abutted on the other side of the linear guide rail to press the linear guide rail toward the reference face.

FIG. 1 is a cross-sectional view illustrating a fitted state of a conventional pressure holding device, and FIG. 2 is a plan view of a conventional pressure contact member.

In these figures, reference numeral 11 denotes a base serving as an installation portion, 12 denotes an insertion hole formed in a predetermined position of the base 11, and 20 denotes a pressure holding device fitted in the base and functioning as a fitting member. The pressure holding device 20 includes a pressure contact member 13 and a fixing screw 14 for fixing the pressure contact member 13 to the base 11.

The pressure contact member 13 includes a cylindrical boss 15 received in the insertion hole 12 and an eccentric cam 16 formed adjacent to the boss 15 and abutted on the side of an unillustrated linear guide rail on the base 11.

The eccentric cam 16 includes a rectangular portion 18 for gripping the pressure contact member 13 by a spanner or the like for rotation, and a semi-circular pressure portion 19 for pressing the side of the linear guide rail along with rotation of the pressure contact member 13. In addition, the shaft center of the pressure portion 19 is offset from a shaft center Cn1 of the boss 15, and as the pressure contact member 13 is rotated, a distance m1 between an outer circumferential surface S1 of the pressure portion 19 and the shaft center Cn1 of the boss 15 changes depending on a rotation angle of the pressure contact member 13.

The base 11 has a screw hole 22 formed therein in communication with the insertion hole 12, while the pressure contact member 13 has a through hole 23 formed therein for the fixing screw 14 to pass therethrough in a concentric manner with the screw hole 22. In addition, the through hole 23 has a hole 25 formed in the boss 15 and having a circular section, and a screw seat 26 formed in the eccentric cam 16 in communication with the hole 25 and having a conical section.

Moreover, the fixing screw 14 consists of a countersunk head screw, including a thread portion 27 and a head portion 28 formed adjacent to and integrally with the thread portion 27 and having a conical shape. By passing the thread portion 27 of the fixing screw 14 through the through hole 23 to be threaded in the screw hole 22, the head portion 28 is pressed against the screw seat 26.

For the pressure holding device 20 with the above-described configuration, by loosely threading the thread portion 27 and the screw hole 22 together and rotating the pressure contact member 13 by a spanner or the like while the fixing bolt of the linear guide rail is loosened and the reference face abuts on the one side of the linear guide rail, the outer circumferential surface S1 of the pressure potion 19 presses against the other side of the linear guide rail depending on a rotation angle to push the linear guide rail toward the reference face and thus the one side of the linear guide rail and the reference face abut each other.

Consequently, by fastening the fixing screw 14 while the one side of the linear guide rail and the reference face abut each other and fastening the fixing bolt, the pressure contact member 13 is fixed in a predetermined position relative to the base 11. Thus, the linear guide rail can be positioned relative to the base 11 while the one side of the linear guide rail and the reference face accurately abut each other (for example, see Patent Document 1).

Patent Document 1: Japanese Patent Application Publication No. 2003-311631

SUMMARY OF THE INVENTION

However, in the conventional pressure holding device 20 described above, the pressure contact member 13 is fixed to the base 11 by fastening the fixing screw 14, so that sufficient friction force cannot be generated between the pressure contact member 13 and the base 11 to fix the pressure contact member 13 to the base 11.

Thus, the pressure contact member 13 may slightly rotate away from a predetermined position if the linear guide rail is subject to the external force, for example, in which case the one side of the linear guide rail and the reference face cannot maintain the accurate abutment on each other, resulting in the decrease in the positioning accuracy of the linear guide rail relative to the base 11.

The present invention is directed to solve the above-described problems of the conventional pressure holding device, and to provide a fitting member positioning device that can be reliably fixed in a predetermined position relative to the installation portion.

In order to solve these problems, the fitting member positioning device of the present invention includes a first element including an insert portion formed in a predetermined location to be received in an insertion hole, the insert portion having a first thread portion formed therein, and a second element disposed rotatably relative to the first element and movably in the axial direction, having a second thread portion formed therein to be threaded in the first thread portion.

The insert portion includes at its end an annular dilating portion formed integrally in the circumferential direction.

The second element includes an advancing portion for advancing into and integrally dilating the dilating portion in the circumferential direction when the second element is axially moved along with its rotation by the first and second thread portions being threaded together to press the first element against an inner circumferential surface of the insertion hole to prevent the movement of the first element.

According to the present invention, the fitting member positioning device includes a first element including an insert portion formed in a predetermined location to be received in an insertion hole, the insert portion having a first thread portion formed therein, and a second element disposed rotatably relative to the first element and movably in the axial direction, having a second thread portion formed therein to be threaded in the first thread portion.

The insert portion includes at its end an annular dilating portion formed integrally in the circumferential direction.

The second element includes an advancing portion for advancing into and integrally dilating the dilating portion in the circumferential direction when the second element is axially moved along with its rotation by the first and second thread portions being threaded together to press the first element against an inner circumferential surface of the insertion hole to prevent the movement of the first element.

In this manner, when the second element is axially moved, the advancing portion advances into and dilates the dilating portion, so that the fitting member positioning device can be reliably fixed in a predetermined position relative to the installation portion.

Figure 1:
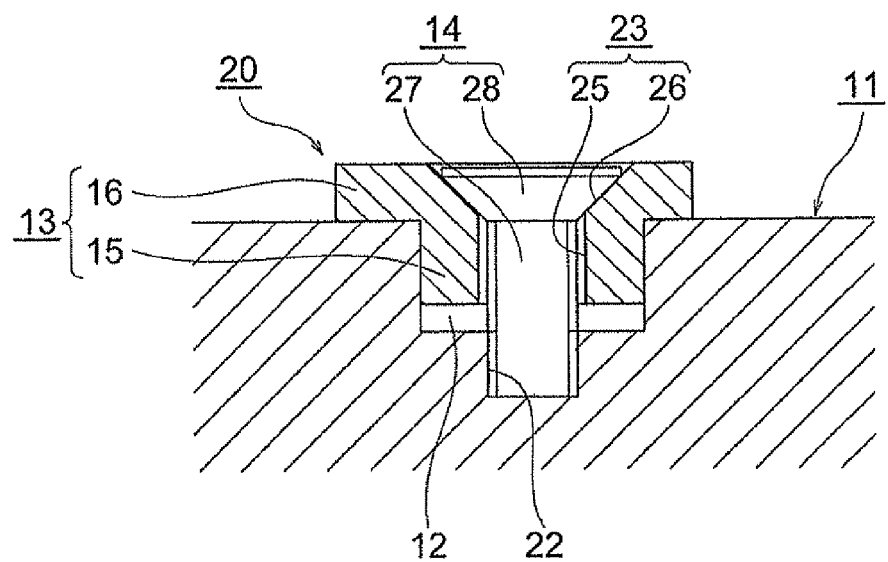
FIG. 1 is a cross-sectional view illustrating a fitted state of a conventional pressure holding device.
Figure 2:
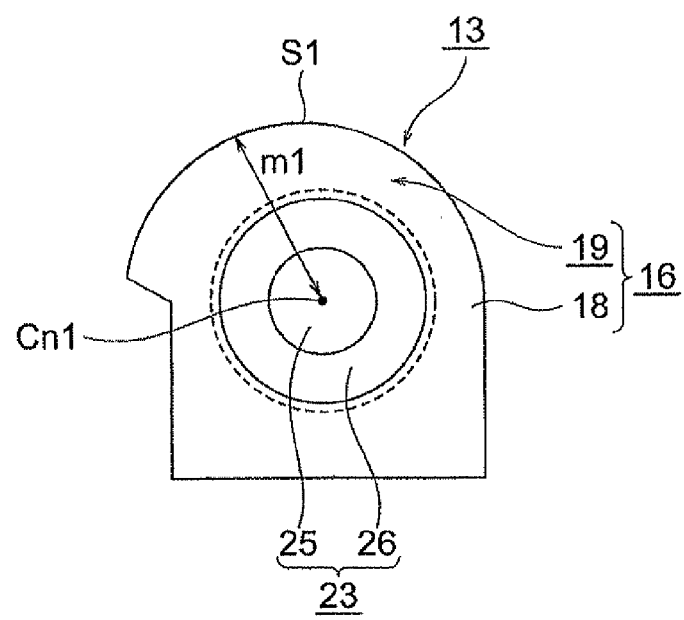
FIG. 2 is a plan view of a conventional pressure contact member.

DESCRIPTION OF SYMBOLS 45, 80: pressure holding device
52, 82: insertion hole
53, 83: rotational shaft
54, 84: rotational shaft member
55, 85: boss
67, 87: thin portion
71, 101: press-fit portion

DETAILED DESCRIPTION OF THE PREFERRED EMBODIMENTS OF THE INVENTION

Description will be hereinafter made of the embodiments of the present invention in detail with reference to the accompanying drawings.

Figure 3:
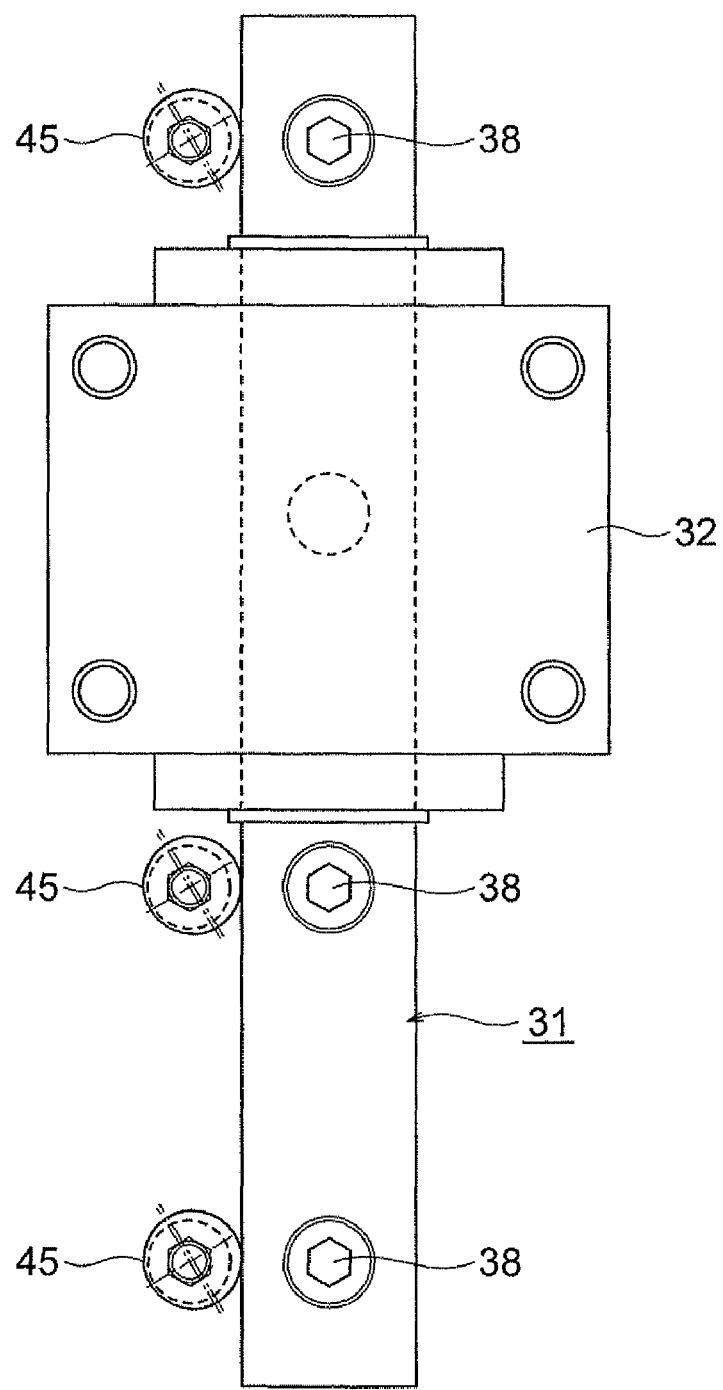
FIG. 3 is a plan view illustrating a disposed state of a linear guide rail according to a first embodiment of the present invention.
Figure 4:
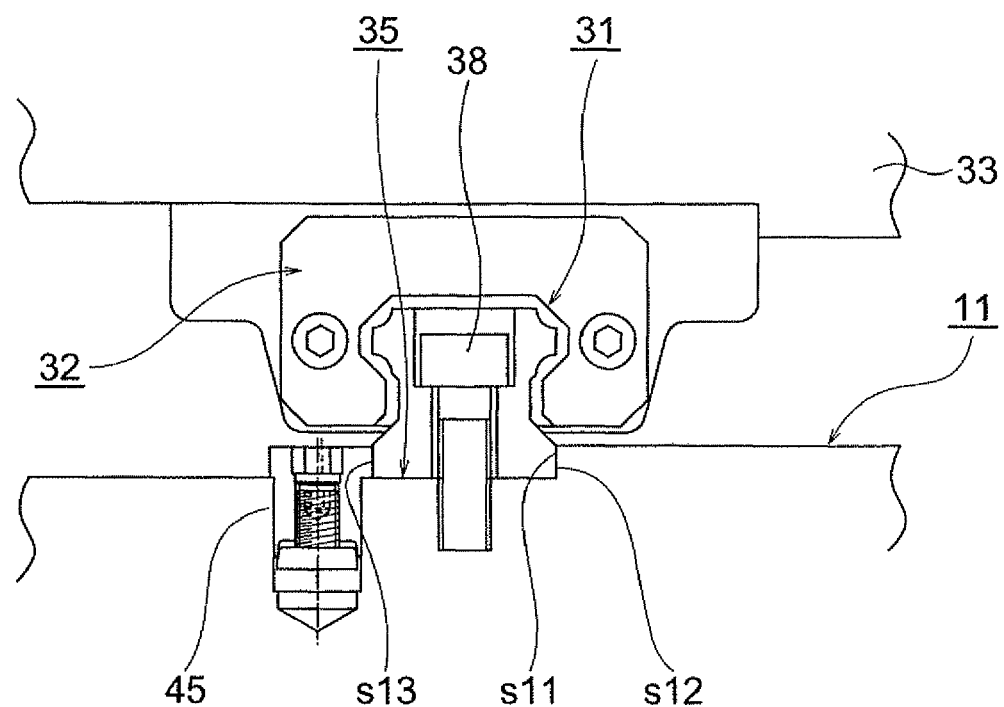
FIG. 4 is a cross-sectional view illustrating a disposed state of the linear guide rail according to the first embodiment of the present invention.

FIG. 3 is a plan view illustrating a disposed state of a linear guide rail according to a first embodiment of the present invention, and FIG. 4 is a cross-sectional view illustrating a disposed state of the linear guide rail according to the first embodiment of the present invention.

In these figures, reference numeral 11 denotes a base serving as an installation portion and serving as a fixing member, 31 denotes a linear guide rail serving as a pressure-contacted member and serving as a guide member, 32 denotes a slider disposed slidably along the linear guide rail 31, and 33 denotes a fitting base serving as a guided member of a machine tool and the like attached to the slider 32. The linear guide rail 31 and the slider 32 configure a linear guide.

The linear guide rail 31 includes a fitting portion 35 at its bottom to be abutted on the base 11.

The base 11 has a vertical reference face s11 along the longitudinal direction of the linear guide rail 31, where the linear guide rail 31 is positioned and fixed relative to the base 11 by abutting one side surface s12 of the fitting portion 35 on the reference face s11 and fastening fixing bolts 38 serving as fixing members at several locations along the longitudinal direction.

In addition, a pressure holding device 45 serving as a fitting member positioning device is abutted on the other side surface s13 of the fitting portion 35 to allow the side surface s12 and the reference face s11 to abut on each other accurately, while the pressure holding device 45 is fixed to the base 11 at several locations along the longitudinal direction of the linear guide rail 31 to press the linear guide rail 31 against the reference face s11. Although in the present embodiment the pressure holding devices 45 are disposed at the same pitch as that of the fixing bolts 38 in a corresponding manner thereto, they may be disposed at a different pitch.

Next, the pressure holding device 45 will be described.

Figure 5:
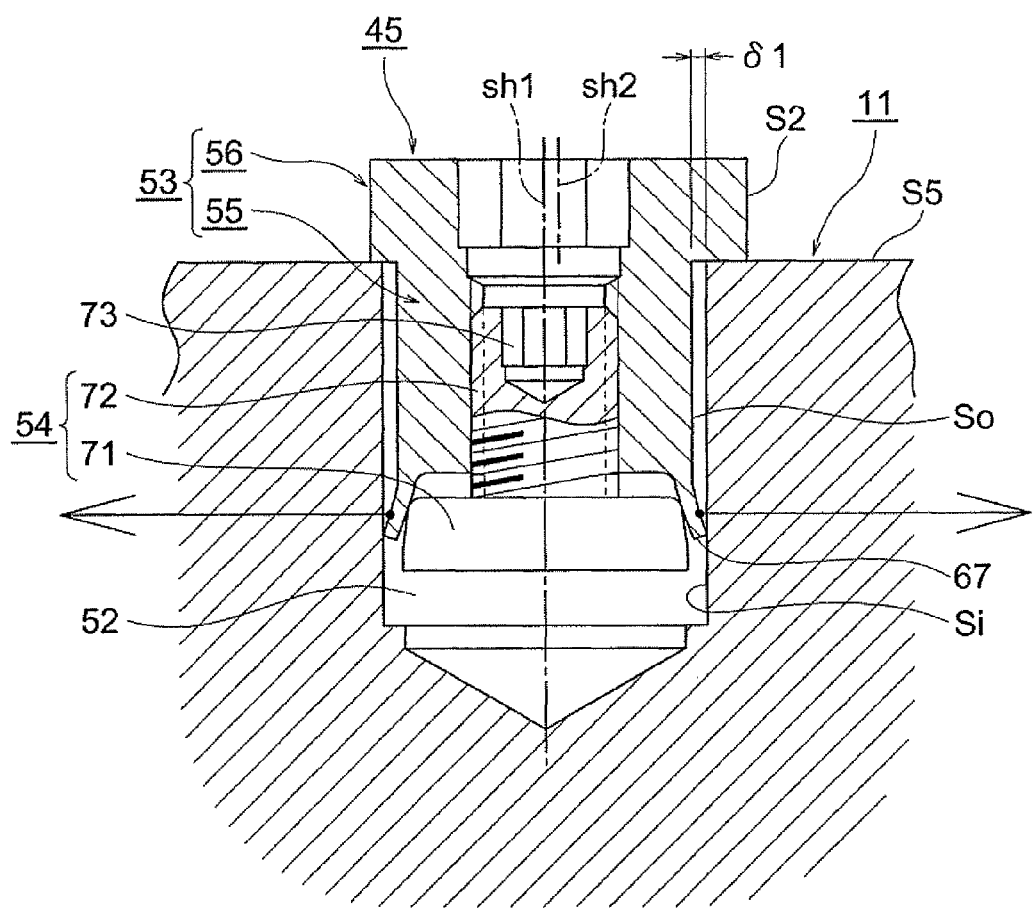
FIG. 5 is a cross-sectional view illustrating a state in which a pressure holding device is fitted to a base according to the first embodiment of the present invention.
Figure 6:
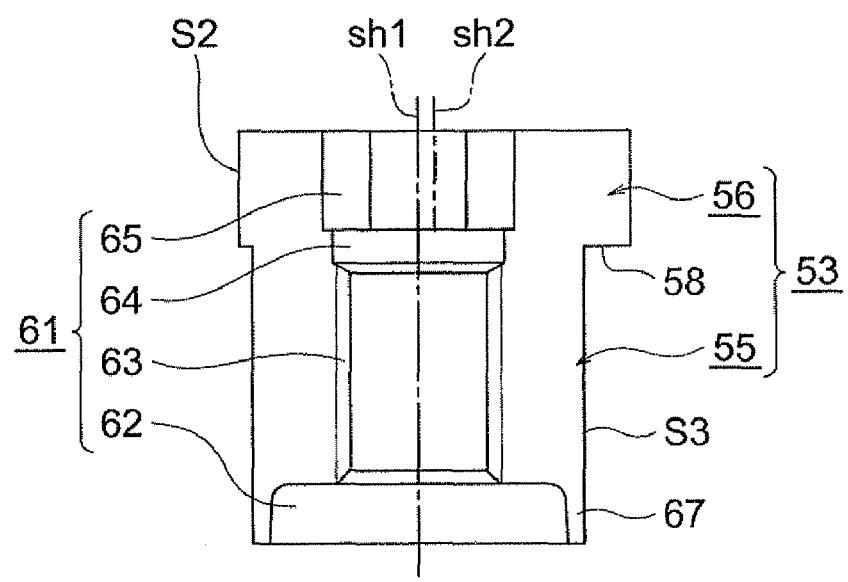
FIG. 6 is a cross-sectional view of a pressure contact member according to the first embodiment of the present invention.
Figure 7:
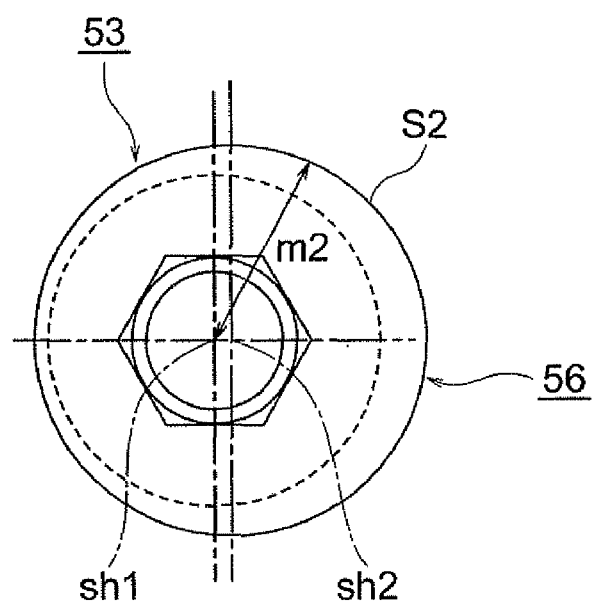
FIG. 7 is a plan view of the pressure contact member according to the first embodiment of the present invention.
Figure 8:
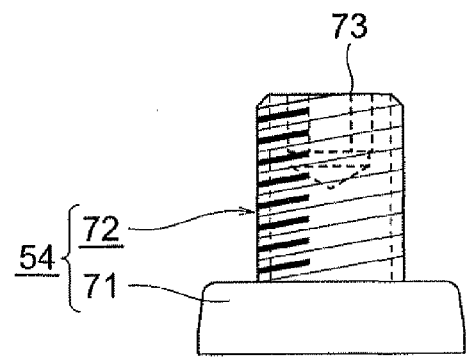
FIG. 8 is an elevation view of a rotational shaft member according to the first embodiment of the present invention.
Figure 9:
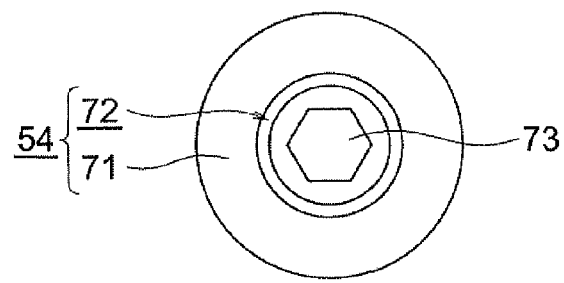
FIG. 9 is a plan view of the rotational shaft member according to the first embodiment of the present invention.
Figure 10:
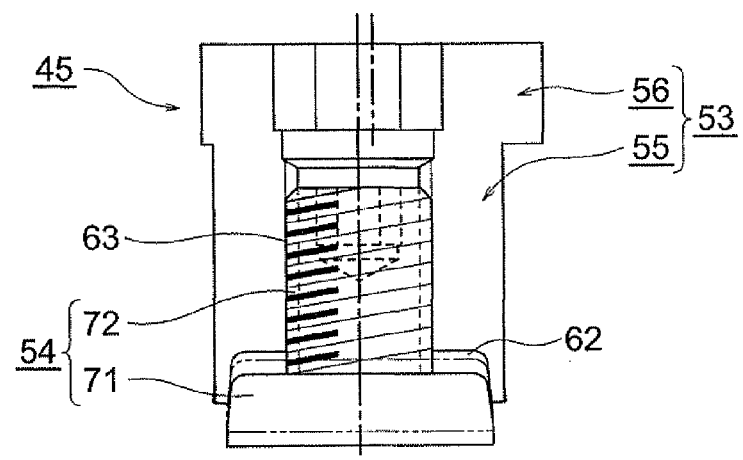
FIG. 10 illustrates an assembled state of the pressure holding device according to the first embodiment of the present invention.
Figure 11:
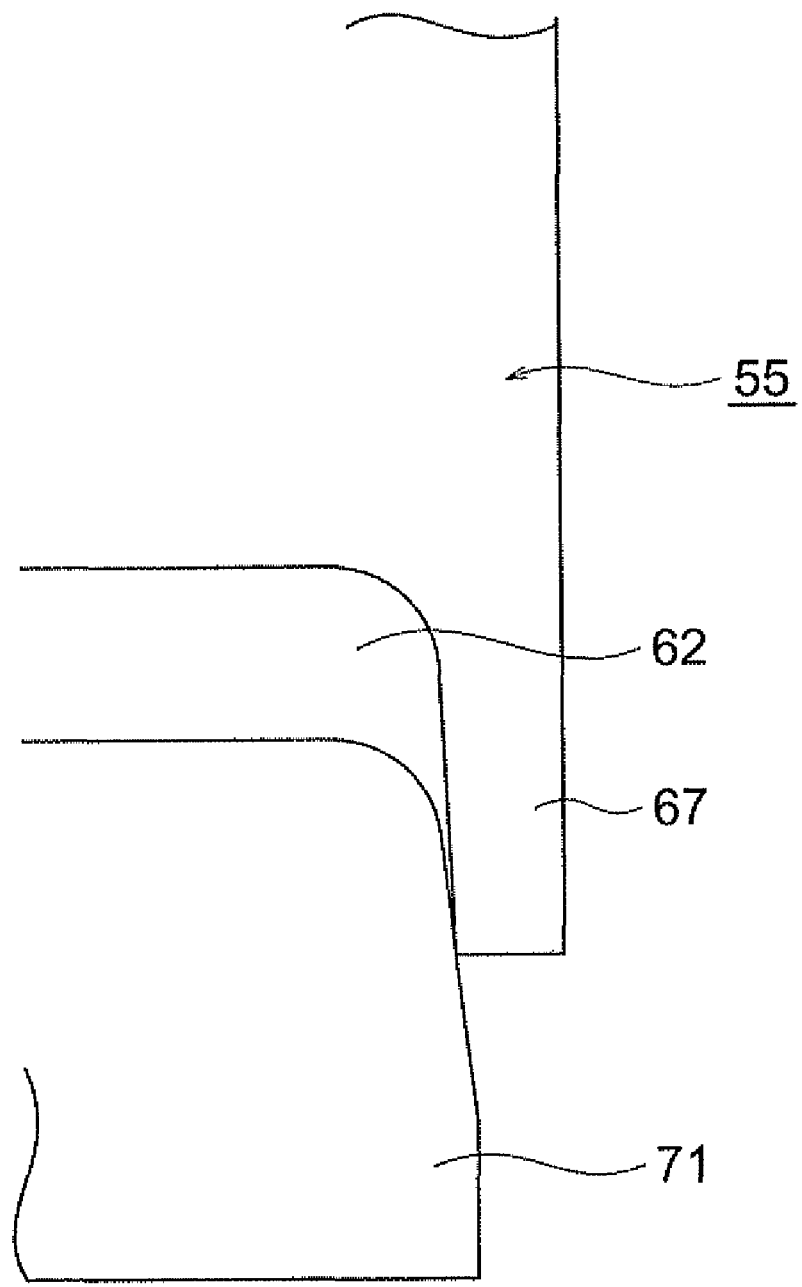
FIG. 11 illustrates a main part of the pressure holding device before assembly according to the first embodiment of the present invention.
Figure 12:
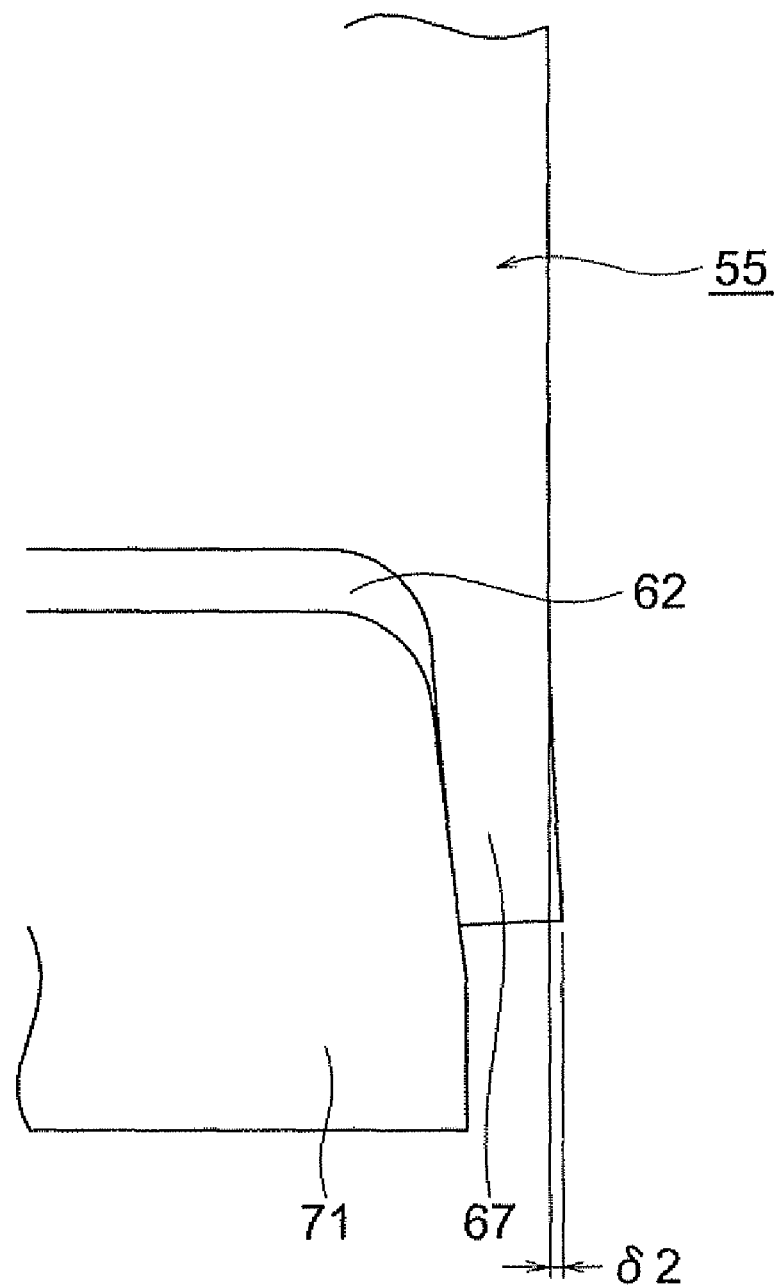
FIG. 12 illustrates the main part of the pressure holding device after assembly according to the first embodiment of the present invention.

FIG. 5 is a cross-sectional view illustrating a state in which a pressure holding device is fitted to a base according to the first embodiment of the present invention, FIG. 6 is a cross-sectional view of a pressure contact member according to the first embodiment of the present invention, FIG. 7 is a plan view of the pressure contact member according to the first embodiment of the present invention, FIG. 8 is an elevation view of a rotational shaft member according to the first embodiment of the present invention, FIG. 9 is a plan view of the rotational shaft member according to the first embodiment of the present invention, FIG. 10 illustrates an assembled state of the pressure holding device according to the first embodiment of the present invention, FIG. 11 illustrates a main part of the pressure holding device before assembly according to the first embodiment of the present invention, and FIG. 12 illustrates the main part of the pressure holding device after assembly according to the first embodiment of the present invention.

In these figures, reference numeral 11 denotes the base, 45 denotes the pressure holding device fitted to the base 11 and functioning as a fitting member, and 52 denotes a columnar insertion hole formed in several locations of the base 11 along the linear guide rail 31 (FIG. 3). The pressure holding device 45 includes a pressure contact member 53 serving as a first element disposed rotatably relative to the base 11, and a rotational shaft member 54 serving as a second element disposed movably in the axial direction relative to the pressure contact member 53 for fixing the pressure contact member 53 to the base 11. Although the pressure contact member 53 and the rotational shaft member 54 are both formed of metal, they may be formed of resin.

The pressure contact member 53 includes a cylindrical boss 55 serving as an insert portion formed in a predetermined location to be received in the insertion hole 52 when fitted to the base 11, and a cylindrical eccentric cam 56 formed adjacent to and integrally with the boss 55 to be abutted on the side surface s13 of the fitting portion 35 externally to the insertion hole 52 on the base 11. Here, a clearance 51 between an outer circumferential surface So of the boss 55 and an inner circumferential surface Si of the insertion hole 52 when the boss 55 is received in the insertion hole 52 is defined as small as possible, i.e., 0.01 mm or smaller if the outer diameter of the boss 55 is approximately 10 mm, for example.

Provided that sh1 denotes a shaft center of the boss 55 and sh2 denotes a shaft center of the eccentric cam 56, the shaft center sh2 is offset from the shaft center sh1, and as the pressure contact member 53 is rotated, a distance m2 between an outer circumferential surface S2 of the eccentric cam 56 and the shaft center sh1 of the boss 55 changes depending on a rotation angle of the pressure contact member 53. Here, the outer circumferential surface S2 of the eccentric cam 56 is located radially outward from the outer circumferential surface S3 of the boss 55 over the entire periphery, and an annular abutment face 58 is formed on the bottom surface of the eccentric cam 56. Thus, the pressure contact member 53 can be stably fixed to the base 11 by abutting the abutment face 58 on a face S5 of the base 11.

Although in the present embodiment the outer rim of the eccentric cam 56 is circular in shape, it can be made to be elliptical or clothoidal.

In addition, the pressure contact member 53 has a through hole 61 formed concentrically with the boss 55, i.e., along the shaft center sh1. The through hole 61 includes a press-fit space 62 serving as a large opening portion formed in the lower end of the boss 55 over a predetermined dimension, a female-threaded first thread portion 63 formed above the press-fit space 62 with a smaller diameter than that of the press-fit space 62, a circular small opening portion 64 formed above the first thread portion 63, and a socket 65 formed in the upper end of the eccentric cam 56. The socket 65 functions as a first locking portion into which a first wrench serving as an unillustrated first tool is inserted and locked, and functions as a rotational operation portion to rotate the pressure contact member 53.

In addition, the rotational shaft member 54 includes a conical press-fit portion 71 serving as an advancing portion and serving as a large-diameter portion to advance and press-fit into the press-fit space 62 along with the axial movement of the rotational shaft member 54, and a male-threaded second thread portion 72 formed above the press-fit portion 71 with a smaller outer diameter than that of the press-fit portion 71 to be threaded in the first thread portion 63, the second thread portion 72 having a socket 73 formed in the upper half thereof. The socket 73 functions as a second locking portion into which a second wrench serving as an unillustrated second tool is inserted and locked, and functions as a rotational operation portion to rotate the rotational shaft member 54.

Here, a small opening portion 64 formed between the first thread portion 63 and the socket 65 serves to eject chips produced when the socket 65 is formed by means of a punch.

Although in the present embodiment the sockets 65, 73 are both formed of hexagonal holes, they may be formed of holes having various shapes such as rectangle, pentagon, ellipse, or the like, for example, depending on the shapes of the first and second tools, as long as they are capable of rotating the pressure contact member 53 and the rotational shaft member 54, respectively. Also as for the socket 73, the second tool may be a cross or straight slot screwdriver, for example, in which case a cross slot, a straight slot, or the like is formed in the pressure contact member 53 and the rotational shaft member 54.

The inner diameter of the press-fit space 62 is defined slightly smaller than the outer diameter of the boss 55, and an annular thin portion 67 serving as a dilating portion is formed at the end, in the present embodiment, the lower end of the boss 55. The radial dimension of the thin portion 67 at its lower end is defined between 0.1 mm and 1 mm, for example. In addition, the inner diameter of the press-fit space 62 is slightly tapered from the lower end to the upper end to form a first tapered face on the inner circumference of the thin portion 67, where the angle, a taper angle $\theta 1$, formed by the shaft center sh1 of the boss 55 and the inner circumferential surface of the press-fit space 62 is defined approximately 3 degrees, for example.

Moreover, the outer diameter of the press-fit portion 71 is slightly tapered from the lower end to the upper end, for example, to form a second tapered face on the outer circumference of the press-fit portion 71, where the angle, a taper angle $\theta 2$, between the shaft center sh1 of the boss 55 and the outer circumferential surface of the press-fit portion 71 is defined larger than the taper angle $\theta 1$, or approximately 7 degrees, for example.

For the pressure holding device 45 with the above-described configuration, it is set in the insertion hole 52 of the base 11 while the fixing bolt 38 of the linear guide rail 31 is loosened and the reference face s11 abuts on the side surface s12 of the fitting portion 35. Although the pressure holding device 45 is preassembled at this point by the first and second thread portions 63, 72 being threaded together, the press-fit portion 71 remains not pressed into the press-fit space 62 as illustrated by the solid line in FIG. 10 (see also FIG. 11).

Consequently, by inserting a first wrench into the socket 65 to rotate the pressure holding device 45, the side surface s13 of the fitting portion 35 and the outer circumferential surface S2 of the eccentric cam 56 approach each other. Then, by further rotating the pressure holding device 45, the side surface s13 and the outer circumferential surface 52 abut each other so that the outer circumferential surface S2 presses against the side surface s13 depending on the rotation angle to push the linear guide rail 31 toward the reference face s11 and thus the side surface s12 of the fitting portion 35 and the reference face s11 abut each other.

Then, by withdrawing the first wrench from the socket 65 and inserting a second wrench into the socket 73 to rotate the rotational shaft member 54, the rotational shaft member 54 is moved axially, in the present embodiment, upward, so that the press-fit portion 71 is pressed into the press-fit space 62 as illustrated by the dashed line in FIG. 10 (see also FIG. 12).

Along therewith, the thin portion 67 is dilated radially outward (illustrated by the arrow) as shown in FIG. 5 so that it is pressed against the inner circumferential surface Si of the insertion hole 52, and the pressure contact force generated at this point prevents the pressure contact member 53 from rotation in the insertion hole 52 to fix it in a predetermined position relative to the base 11.

Thus, the linear guide rail 31 can be positioned relative to the base 11 while the side surface s12 of the fitting portion 35 and the reference face s11 accurately abut each other. Here, a predetermined margin of dilation 52 is created at the lower end of the thin portion 67 when the press-fit portion 71 is pressed into the press-fit space 62.

As described above, in the present embodiment, by axially moving the rotational shaft member 54 and pressing the press-fit portion 71 into the press-fit space 62, the thin portion 67 is dilated radially outward and the taper angles $\theta 1$, $\theta 2$ are both defined smaller than the angle at which sliding occurs, i.e., a friction angle. Thus, even when the linear guide rail 31 is subject to the external force, the first and second thread portions 63, 72 do not loosen nor the pressure contact force to press the thin portion 67 against the inner circumferential surface Si of the insertion hole 52 is not compromised.

Thus, the pressure contact member 53 can be reliably fixed to the base 11 in a predetermined position. Thereby the fixed state of the pressure contact member 53 to the base in a predetermined position is maintained, so that the side surface s12 of the fitting portion 35 and the reference face s11 can maintain their accurate abutment to each other. As a result, it can improve the positioning accuracy of the linear guide rail 31 relative to the base 11.

In addition, since in the present embodiment the thin portion 67 is formed integrally in the circumferential direction and in a ring shape without any separation by slitting or the like, the thin portion 67 can be strengthened as well as the pressure contact force exerted on the thin portion 67 when dilated radially outward can be distributed evenly in the circumferential direction. Thus, the pressure contact member 53 can be stably fixed to the base 11.

Moreover, since the rotational movement is converted into the linear movement by threading the first and second thread portions 63, 72 together and thereby the rotational shaft member 54 is moved axially, a torque for rotating the rotational shaft member 54 can be reduced.

Further, since the press-fit portion 71 is pressed into the press-fit space 62 while rotating and sliding along the thin portion 67, the torque can be reduced. In this manner, the pressure holding device 45 can be readily operated.

Moreover, since the slight axial movement of the rotational shaft member 54 allows the press-fit portion 71 to be pressed into the press-fit space 62 and the thin portion 67 to be dilated, the axial dimensions of the thin portion 67 and the pressure holding device 45 can be decreased. Thus, the distance between the slider 32 and the base 11 can be reduced, thereby enhancing a degree of freedom in terms of selection of the linear guide rail 31.

In addition, since in the present embodiment the clearance δ1 is defined quite small, the margin of dilation δ2 of the thin portion 67 can be reduced accordingly. Thus, each diameter of the boss 55 and the rotational shaft member 54 can be decreased, thereby downsizing the pressure holding device 45.

Next, a second embodiment of the present invention will be described to allow the increase in the positioning accuracy of gears relative to a rotational shaft when fixing the gears to the rotational shaft of various rotating devices to form a gear system.

Figure 13:
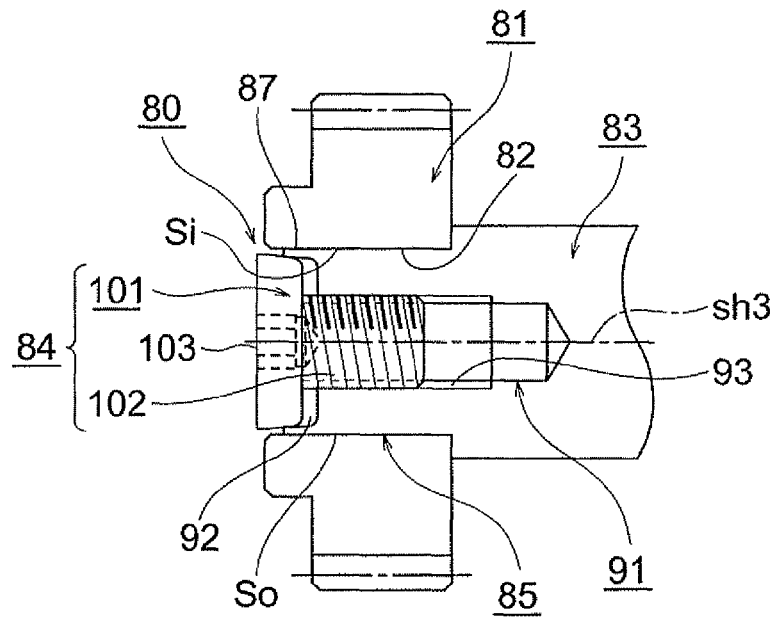
FIG. 13 is a cross-sectional view of a gear system according to a second embodiment of the present invention.
Figure 14:
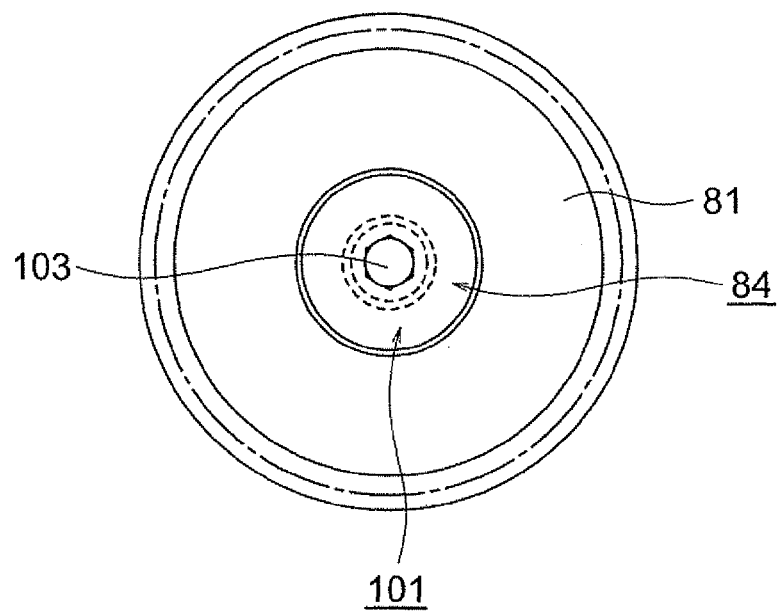
FIG. 14 is a side view of the gear system according to the second embodiment of the present invention.

FIG. 13 is a cross-sectional view of a gear system according to the second embodiment of the present invention, and FIG. 14 is a side view of the gear system according to the second embodiment of the present invention.

In these figures, reference numeral 80 denotes a pressure holding device serving as a fitting member positioning device, 81 denotes a gear serving as an installation portion and serving as a fixing member, and 82 denotes a columnar insertion hole formed in the gear 81.

The pressure holding device 80 includes a rotational shaft 83 serving as a first element disposed rotatably relative to the gear 81 and a rotational shaft member 84 serving as a second element disposed movably in the axial direction relative to the rotational shaft 83 for fixing the rotational shaft 83 to the gear 81, and functions as a fitting member. Here, the pressure holding device 80 and the gear 81 configure the gear system.

The rotational shaft 83 includes a cylindrical boss 85 serving as an insert portion formed in a predetermined location to be received in the insertion hole 82 when the gear 81 is fitted. Here, a clearance between the outer circumferential surface So of the boss 85 and the inner circumferential surface Si of the insertion hole 82 when the boss 85 is inserted into the insertion hole 82 is defined as small as possible, i.e., 0.01 mm if the outer diameter of the boss 85 is approximately 10 mm, for example.

In addition, the rotational shaft 83 has a fitting hole 91 which includes a press-fit space 92 serving as a large opening portion formed in the tip (at one end) of the boss 85 over a predetermined dimension, and a female-threaded first thread portion 93 formed rearward (at the other end) of the press-fit space 92 with a smaller diameter than that of the press-fit space 92.

In addition, the rotational shaft member 84 includes a conical press-fit portion 101 at its front end serving as an advancing portion and serving as a large-diameter portion to advance and press-fit into the press-fit space 92 along with the axial movement of the rotational shaft member 84, and a male-threaded second thread portion 102 formed rearward of the press-fit portion 101 with a smaller outer diameter than that of the press-fit portion 101 to be threaded in the first thread portion 93, the press-fit portion 101 having a socket 103 formed in the front half thereof. The socket 103 functions as a locking portion into which a wrench serving as an unillustrated tool is inserted and locked, and functions as a rotational operation portion to rotate the rotational shaft member 83.

Incidentally, the inner diameter of the press-fit space 92 is defined slightly smaller than the outer diameter of the boss 85, and an annular thin portion 87 serving as a dilating portion is formed at the end, in the present embodiment, the tip of the boss 85. The radial dimension of the thin portion at its tip is defined between 0.1 mm and 1 mm, for example. In addition, the inner diameter of the press-fit space 92 is slightly tapered from the front end to the rear end to form a first tapered face on the inner circumference of the press-fit space 92, where a taper angle formed by the shaft center sh3 of the boss 85 and the inner circumferential surface of the press-fit space 92 is defined approximately 3 degrees, for example.

Moreover, the outer diameter of the press-fit portion 101 is slightly tapered from the front end to the rear end to form a second tapered face on the outer circumference of the press-fit portion 101, where a taper angle between the shaft center sh3 of the boss 85 and the outer circumferential surface of the press-fit portion 101 is defined approximately 7 degrees, for example.

For the pressure holding device 80 with the above-described configuration, it is set in the insertion hole 82 of the gear 81. Although the pressure holding device 80 is preassembled at this point by the first and second thread portions 93, 102 being threaded together, the press-fit portion 101 remains not pressed into the press-fit space 92.

Consequently, by inserting a wrench into the socket 103 to rotate the rotational shaft member 84, the rotational shaft member 84 is moved axially so that the press-fit portion 101 is pressed into the press-fit space 92.

Along therewith, the thin portion 87 is dilated radially outward so that it is pressed against the inner circumferential surface Si of the insertion hole 82, and the pressure contact force generated at this point prevents the rotational shaft member 83 from rotation in the insertion hole 82 to fix it in a predetermined position relative to the gear 81.

As described above, in the present embodiment, by axially moving the rotational shaft member 84 and pressing the press-fit portion 101 into the press-fit space 92, the thin portion 87 is dilated radially outward and thus the friction angle can be widened. Thus, even when the gear 81 is subject to the external force, the rotational shaft member 84 does not rotate relative to the rotational shaft 83 nor the pressure contact force to press the thin portion 87 against the inner circumferential surface Si of the press-fit space 92 is not compromised.

As a result, the rotational shaft 83 can be reliably fixed in a predetermined position relative to the gear 81. Thereby the fixed state of the rotational shaft 83 in a predetermined position relative to the gear 81 can be maintained, so that the phase alignment of teeth of the gear 81 can be performed accurately.

It should be noted that the present invention is not limited to the above-described embodiments and various modifications can be made based on the spirit of the present invention without departing from the scope of the present invention.

What is claimed is:

1. A fitting member positioning device comprising:
    (a) a first element including an insert portion formed in a predetermined location to be received in an insertion hole, the insert portion having a first thread portion formed therein;
    (b) a second element disposed rotatably relative to the first element and movably in the axial direction, having a second thread portion formed thereon to be threaded in the first thread portion; and
    (c) a base having an insertion hole formed therein; wherein,
    (d) the first element is disposed rotatably relative to the base and integrally with the insert portion, the first element including an eccentric cam which is brought into abutment against a guide member on a reference face, defined on the base externally to the insertion hole, by rotation of the first element; and
    (e) the insert portion includes at its end a dilating portion formed integrally around the circumference of the insert portion, the dilating portion has an annular shape defining a continuous perimeter having a ring shape, and
    (f) the second element includes an advancing portion adapted to be advanced into and integrally dilate the dilating portion in the circumferential direction when the second element is axially moved along with its rotation by the first and second thread portions being threaded together to press the first element against an inner circumferential surface of the insertion hole to prevent rotation of the first element.

2. A fitting member positioning device as claimed in claim 1, wherein the advancing portion comprises a tapered surface.

3. A fitting member positioning device as claimed in claim 1, wherein the insert portion has an outer circumferential surface and a recess in its end defining an inner circumferential surface, and wherein the dilating portion is an integral portion of the first element extending axially between the inner and outer circumferential surfaces.

* * * * *